United States Patent
Hegler

(10) Patent No.: US 6,343,623 B2
(45) Date of Patent: Feb. 5, 2002

(54) SEALING RING FOR CONNECTING THE SPIGOT OF A CORRUGATED PIPE WITH A PIPE SOCKET HAVING A SMOOTH INSIDE WALL

(76) Inventor: Ralph Peter Hegler, Schillerstrasse 7, D-97688 Bad Kissingen (DE)

( * ) Notice: Subject to any disclaimer, the term of this patent is extended or adjusted under 35 U.S.C. 154(b) by 0 days.

(21) Appl. No.: 09/824,396

(22) Filed: Apr. 2, 2001

(30) Foreign Application Priority Data

Apr. 6, 2000 (DE) .......................................... 100 17 221

(51) Int. Cl.[7] ................................................. F16L 17/03
(52) U.S. Cl. ........................ 138/109; 138/121; 285/231; 285/903; 285/910; 277/625; 277/626
(58) Field of Search ................................. 138/109, 120, 138/121, 155; 285/231, 903, 910, 347; 277/625, 626

(56) References Cited

U.S. PATENT DOCUMENTS

| | | | |
|---|---|---|---|
| 4,368,894 A | * 1/1983 | Parmann .................. | 285/231 X |
| 4,487,421 A | * 12/1984 | Housas et al. .......... | 277/626 X |
| 4,616,857 A | * 10/1986 | Woodman et al. ......... | 285/140 |
| 4,779,651 A | 10/1988 | Hegler et al. ................ | 138/109 |
| 4,946,206 A | * 8/1990 | Roe et al. ................ | 285/910 X |
| 5,326,138 A | 7/1994 | Claes et al. ................. | 285/110 |
| 5,415,436 A | * 5/1995 | Claes et al. ............ | 285/910 X |
| 5,707,088 A | 1/1998 | Miller et al. ................. | 285/345 |
| 5,996,635 A | 12/1999 | Hegler ........................ | 138/109 |

FOREIGN PATENT DOCUMENTS

| | | |
|---|---|---|
| DE | 3603481 | 8/1987 |
| DE | 3605330 | 8/1987 |
| DE | 3921075 | 1/1991 |
| DE | 69100542 | 12/1993 |
| DE | 19604311 | 8/1997 |
| EP | 0012166 | 6/1980 |

* cited by examiner

*Primary Examiner*—Patrick Brinson
(74) *Attorney, Agent, or Firm*—Robert F. I. Conte; Lee, Mann, Smith, McWilliams, Sweeney & Ohlson

(57) ABSTRACT

A sealing ring for sealing the connection of a spigot of a corrugated pipe with a pipe socket has inner beads and lip seals bearing against flanges. Said sealing ring further has an outwardly projecting sealing bead having a central annular bead and two annular collars projecting laterally outward. When said pipe socket is pushed onto said spigot, said sealing bead is rolled in in such a manner that said central annular bead and one annular collar bear against said inside wall of said socket in a sealing-tight fashion.

11 Claims, 1 Drawing Sheet

SEALING RING FOR CONNECTING THE SPIGOT OF A CORRUGATED PIPE WITH A PIPE SOCKET HAVING A SMOOTH INSIDE WALL

BACKGROUND OF THE INVENTION

1. Field of the Invention

The invention is related to a sealing ring made of a rubber-elastic material to provide a media-tight connection between a spigot of a corrugated pipe
    having two adjacent corrugated sections having
    a facing flange,
    a foot section connecting said flanges in transition sections; and
    defining between each other an annular groove for receiving said sealing ring, and
a pipe socket
    having a smooth, essentially cylindrical inside wall, which pipe socket is capable of being pushed in a pushing direction onto said spigot,
wherein said sealing ring is formed mirror-symmetrically and has
    a basic body
        having an inner bead bearing against said foot section,
        having side areas facing said flanges,
        having an annular seal formed on the outer section of each side area and projecting laterally towards said flange, and
        having an outer sealing bead for bearing against said inside wall of said pipe socket

2. Background Art

A sealing ring of the generic type known from EP 0 012 166 B 1 has an inner bead bearing against the foot section and a laterally projecting annular seal on each side, formed as an annular collar fitting close to the transition region between the flange and the peripheral section. It further has an outwardly projecting sealing bead formed as an annular bead which bears against the inside wall of the socket. Regarding over-wide annular grooves, the extension of which in a longitudinal direction of the pipe exceeds by far their depth, it is further known to duplicate the sealing ring wherein two sealing rings of a similar shape are connected with each other at a central section. In case of these known sealing rings, the sealing function is almost completely accomplished by the compression of the sealing ring, i.e. by, so to speak, a controlled squeezing of the sealing ring. "Controlled" squeezing means that the sealing and reaction force is achieved between the sealing ring and the associated pipe or socket sections without exposing the weaker sections, such as the flanges, to extreme stress.

It is known from U.S. Pat. No. 5,326,183 to use a sealing ring for connecting the spigot of a corrugated pipe with an essentially smooth-walled socket, said sealing ring filling the annular groove between two adjacent corrugation sections and having an external sealing lip projecting laterally and outwardly and engaging an appropriate recess in the socket just in the manner of a barb. In this case, it is disadvantageous that in practice the unsym-metrical construction may cause considerable sealing problems if mounted wrongly.

For a connection between a corrugated pipe and pipe socket, a sealing ring acting as compression seal is known from DE 36 05 330 C2 which sealing ring has two basic bodies connected with each other which bodies are inserted into two adjacent annular grooves between corrugation sections wherein a sealing bead is formed fitting close to the inside wall of the socket.

SUMMARY OF THE INVENTION

It is an object of the invention to form a sealing ring of the appropriate type so that in case of a particularly high sealing capacity even larger manufacturing tolerances, especially with respect to large pipes, can be compensated.

According to the present invention, this object is achieved in that said sealing bead has a central annular bead and on both sides one annular collar, respectively, projecting outwardly and laterally, and in that said sealing bead is capable of being rolled in or over in said pushing direction while elastically deforming said basic body, so that the annular collar located upstream in said pushing direction and said annular bead bear against said inside wall. Due to the construction of the sealing bead and its extreme deformability, relatively large diameter tolerances between the outer diameter of the spigot and the inner diameter of the pipe socket can be compensated while at the same time ensuring a media-tight connection, in particular an absolutely secure sealing against liquid leakage. This may be of importance in protected water areas, in the wastewater sector and the like.

Further features, advantages and detail of the invention will become apparent from the ensuing description of an exemplary embodiment, taken in conjunction with the drawing.

DESCRIPTION OF THE PREFERRED EMBODIMENT

Figure 1:
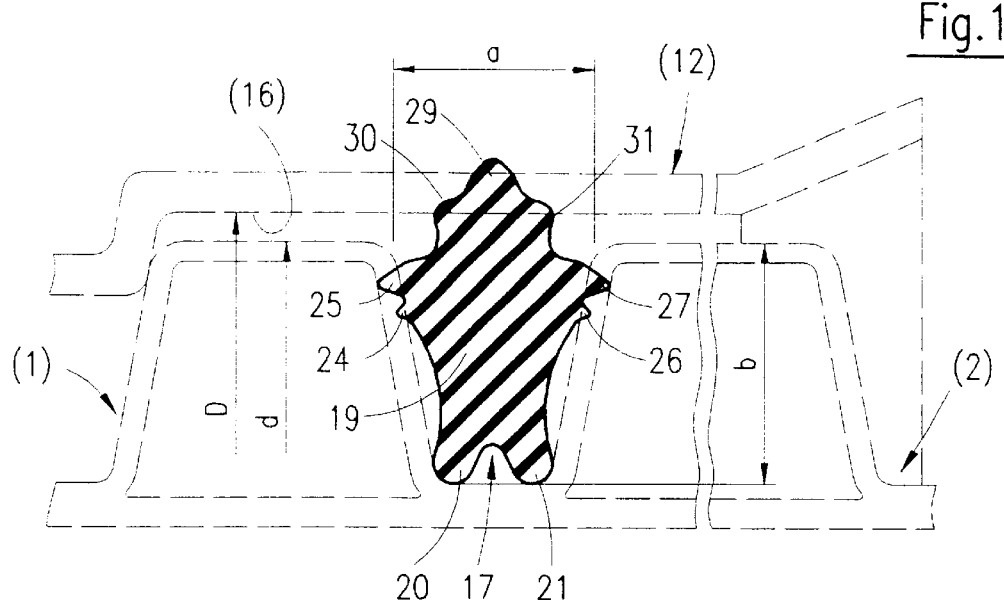
FIG. 1 shows a sealing ring in its non-deformed state with a spigot and a pipe socket being roughly outlined with dashed lines.

The drawing shows a spigot 1 of a corrugated pipe 2 consisting of a smooth-walled inside pipe 3 and a corrugated outside pipe 4. Adjacent corrugated sections 5, 6 have an essentially trapezoid cross-section with flanges 7, 8 adjacent to each other which extend towards each other in the direction towards said inside pipe 3. They are connected with each other by a cylindrical foot section connecting them. The corrugated sections 5, 6 have outer cylindrical peripheral sections 10, 11 each having an outer diameter d. The corrugated pipe 2 shown is a so-called twin wall pipe. It may as well be a single corrugated pipe not having an inside pipe.

Figure 3:
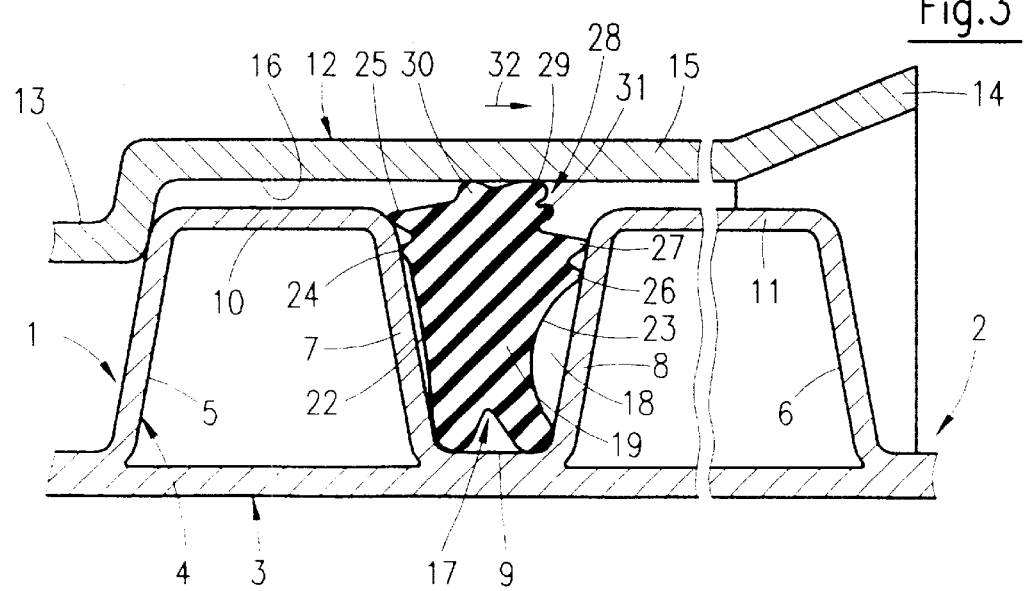
FIG. 3 shows the spigot with the sealing ring inserted according to FIG. 2 and after pushing on the pipe socket.

Further, FIGS. 1 and 3 show a pipe socket 12 which is formed at the end of a further corrugated pipe 13 to be connected to said spigot 1 or is formed as a simple plug socket. Said socket 12 has an introducing end 14 widening outwards and an essentially annular cylindrical receiving section 15 having an appropriate cylindrical inside wall 16 the inner diameter D of which is formed as D>d.

The production of such corrugated pipes 2, 13 having a spigot 1 at one end and a pipe socket 12 at the other end is widely used in practice and known, for instance, from U.S. Pat. No. 5,320,797.

For a media-tight connection of said spigot 1 with said pipe socket 12, at least one sealing ring 17 is used which is inserted into the annular groove 18 of said spigot 1 which groove is defined by said flanges 7, 8 and said foot section 9 and widens outwards. The largest width a of said groove 18 is smaller than its depth b. Said sealing ring 17 is shown in its non-deformed state in FIG. 1 wherein said spigot 1 and said pipe socket 12 are shown in dashed lines in order to roughly outline where said sealing ring 17 will be deformed, i.e. compressed, during its insertion into said groove 18 and during pushing-on said socket 12.

Figure 2:
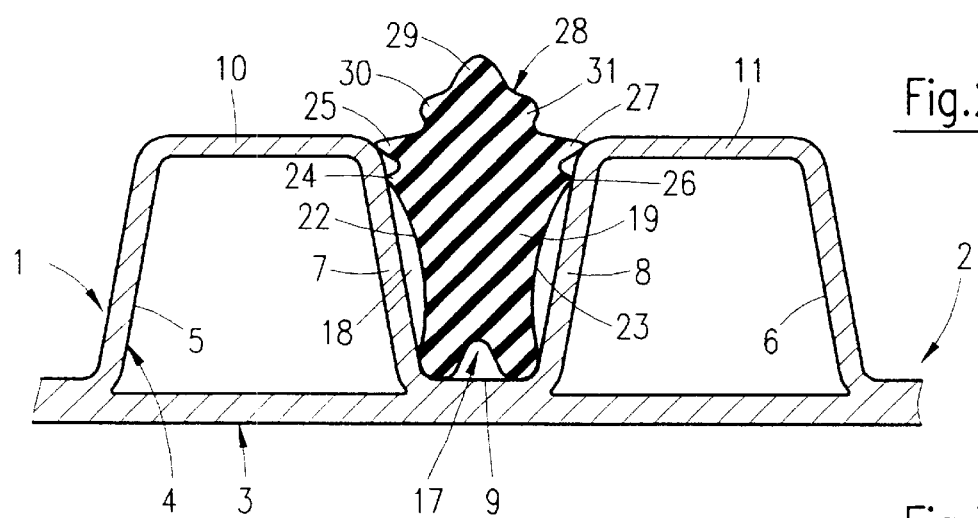
FIG. 2 shows said sealing ring in its state when inserted into the spigot.

Said sealing ring 17 being constructed in a mirror-like symmetry consists of rubber-elastic material and has a basic body 19 roughly adapted to the cross-section of said groove 18. In its inner section it has two annular inner beads 20, 21. Said beads 20, 21 are adapted to match the transition section between said flanges 7 and/or 8 and said foot section 9 and engage without deformation said sections after the insertion of said sealing ring 17 into said groove 18 as illustrated in FIGS. 1 and 2; they fit here in a sealing-tight fashion.

Further, two annular seals projecting laterally towards said flanges 7 and 8, respectively, and being formed as lip seals 24, 25 and 26, 27, respectively, are formed on the side areas 22, 23 of said basic body 19 facing said flanges 7 and 8, respectively. The lip seals 25, 27 being arranged farther outward are located in the non-deformed state slightly beneath the peripheral sections 10, 11. The lip seals 24, 26 less projecting laterally are located relatively near beneath said lip seals 25, 27. Said side areas 22, 23 are formed concavely into said basic body 19 between said lip seals 24 and 26, respectively and said corresponding inner beads 20 and 21, respectively, away from the respective flange 7, 8. In the non-deformed state of said sealing ring 17, said lip seals 24 through 27 extend to a greater width than the width of said groove 18 in this section. This causes said lip seals 24 through 27 to become deformed outwardly when said sealing ring 17 is inserted into said annular groove 18 while at the same time said lip seals are compressed and said basic body 19 is deformed correspondingly. The outer lip seals 25, 27 now rest on the transition section between said peripheral sections 10, 11 and said flanges 7, 8. The inner lip seals 24, 26 rest next to those on said flanges 7, 8, namely with their outer tips, respectively. As can be seen in comparing FIGS. 1 and 2, the concavity of said side areas 22, 23 is slightly reduced when a sealing ring 17 is inserted into said annular groove 18 due to the outward deformation of said lip seals 24 through 27 and due to the compression of said basic body 19. Thus, said side areas 22, 23 come slightly nearer to said flanges 7, 8 as material of said basic body 19 is also pressed from the outside to the inside.

Said sealing ring 17 has on its outer side a sealing bead 28 on the outside of which a central, farthest outwardly projecting annular bead 29 is formed. On both sides of said annular bead 29, annular collars 30, 31 projecting outwardly and laterally, i.e. obliquely outwardly and in so far opposite to each other, are formed. As can be seen in FIG. 1, the central annular bead 29 projects completely and said annular collars 30, 31 project considerably beyond the profile of said socket 12 so as to be deformed when said socket is pushed onto said spigot 1. As can be seen in FIG. 2, the entire sealing bead 28 is still non-deformed after inserting said sealing ring 17 into said groove 18. When pushing said socket 12 onto said spigot 1 in the pushing direction 32, the entire sealing ring 17 is deformed, as can be seen in FIG. 3. Said sealing bead 28 is deformed in the pushing direction 32 relative to the corrugated sections 5, 6, i.e. it is taken along partly in said pushing direction 32. As a consequence, said annular collar 30 located upstream in said pushing direction 32 is, so to speak, turned inside out to bear against said inside wall 16 of said socket 12. Said central annular bead 29 is deformed in said pushing direction 32 but remains as a sealing annular bead 29 in contact with said inside wall 16 of said socket 12. The annular collar 31 located downstream in said pushing direction 32 is deformed so strongly that it no longer bears against said inside wall 16 of said socket 12. Said sealing bead 28 is, so to speak, partly rolled in or rolled over in said pushing direction 32. This also causes a deformation of said basic body 19 in such a way that said side area 22 located upstream in said pushing direction is pressed nearer to the corresponding flange 7 while said lip seals 26, 27 located downstream are displaced more strongly towards the inside at the corresponding flange 8. The corresponding side area 23 is curved more strongly into said basic body 19. Also, the deformation of said inner beads 20, 21 occurring during the stronger curving of said side area 23 due to the corresponding deformation of said basic body 19 takes place only so that its contact with said transition sections between said flanges 7, 8 and said foot section 9 is retained.

The shape of said sealing bead 28 ensures that, irrespective of how said sealing ring 17 is inserted into said groove 18, said central annular bead 29 and one of said annular collars 30 or 31, respectively, always bear against said inside wall 16 of said socket 12. Further, it is ensured that, due to the strong deformation of said sealing ring 17 towards the inside of said groove 18, the bearing pressure between said inner beads 20, 21 and said lip seals 24 through 27 is increased on said flanges 7, 8 and said foot section 9, thus generally providing an excellent sealing effect with respect to all flowable media.

What is claimed is:

1. A sealing ring made of a rubber-elastic material to provide a media-tight connection between a spigot (1) of a corrugated pipe (2)
having two adjacent corrugated sections (5, 6) having a facing flange (7, 8),
a foot section (9) connecting said flanges (7, 8) in transition sections; and
defining between each other an annular groove (18) for receiving said sealing ring (17), and a pipe socket (12)
having a smooth, essentially cylindrical inside wall (16), which pipe socket is capable of being pushed in a pushing direction (32) onto said spigot (1), wherein said sealing ring (17) is formed mirror-symmetrically and has a basic body (19)
having an inner bead (20, 21) bearing against said foot section (9),
having side areas (22, 23) facing said flanges (7, 8),
having an annular seal (24 through 27) formed on the outer section of each side area (22, 23) and projecting laterally towards said flange (7, 8), and
having an outer sealing bead (28) for bearing against said inside wall (16) of said pipe socket (12), wherein said sealing bead (28) has a central annular bead (29) and on both sides one annular collar (30, 31), respectively, projecting outwardly and laterally, and wherein said sealing bead (28) is capable of being rolled in or over in said pushing direction (32) while elastically deforming said basic body (19), so that the annular collar (30) located upstream in said pushing direction (32) and said annular bead (29) bear against said inside wall (16).

2. A sealing ring according to claim 1, wherein said side areas (22, 23) are concavely curved into said basic body (19) between said inner bead (20, 21) and said annular seal (24 through 27).

3. A sealing ring according to claim 1, wherein two adjacent annular seals (24 through 27) are provided in the region of each side area (22, 23).

4. A sealing ring according to claim 1, wherein at least one annular seal corresponding to each side area (22, 23) is formed as a lip seal (24 through 27).

5. A sealing ring according to claim 3, wherein both annular seals corresponding to each side area (22, 23) are formed as lip seals (24 through 27).

6. A sealing ring according to claim 3,
wherein the outer annular seal (25, 27) projects laterally farther than the inner annular seal (24, 26).

7. A sealing ring according to claim 1,
wherein said basic body (19) with said sealing bead (28) is capable of being deformed so that the side area (22) located upstream in said pushing direction (32) is deformed towards the adjacent flange (7) while the side area (23) located downstream is curved more strongly wherein said downstream annular seals (26, 27) are displaceable on the adjacent flange (8) in the direction towards said foot section (9).

8. A sealing ring according to claim 1,
wherein at said basic body (19) two inner beads (20, 21) are formed which bear against the transition sections.

9. A sealing ring according to claim 1,
wherein said annular groove (18) has a width (a) and a depth (b), wherein the largest width of said annular groove (18) is more than said depth (b).

10. A sealing ring according to claim 4,
wherein the outer annular seal (25, 27) projects laterally farther than the inner annular seal (24, 26).

11. A sealing ring according to claim 5,
wherein the outer annular seal (25, 27) projects laterally farther than the inner annular seal (24, 26).

* * * * *